May 8, 1923. 1,454,303
N. WHITE
MONEY PAYING DEVICE
Filed March 5, 1921 5 Sheets-Sheet 1
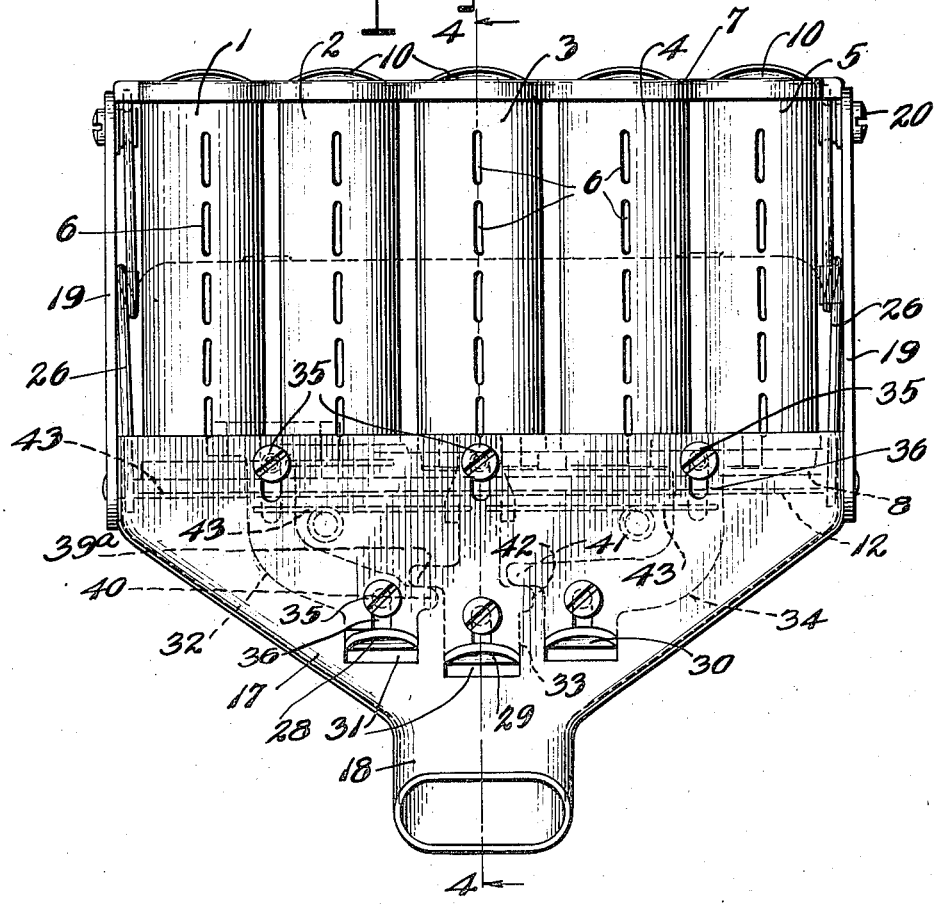
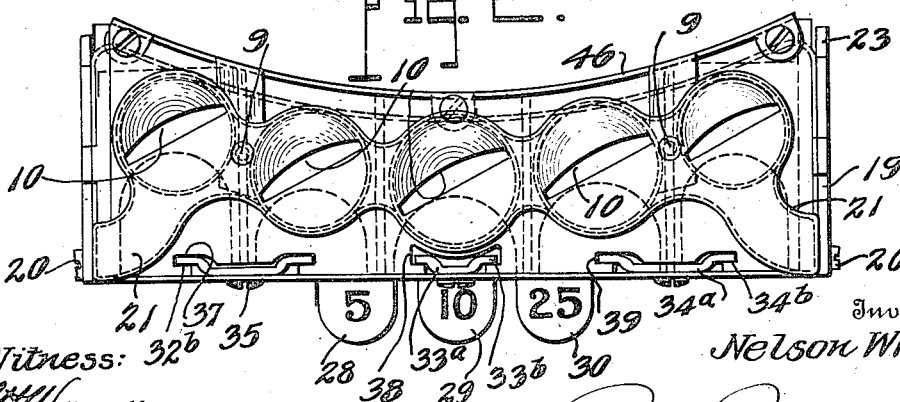
Witness: C. H. Wagner
Inventor
Nelson White
By Robt. Robbs Hill
Attorneys

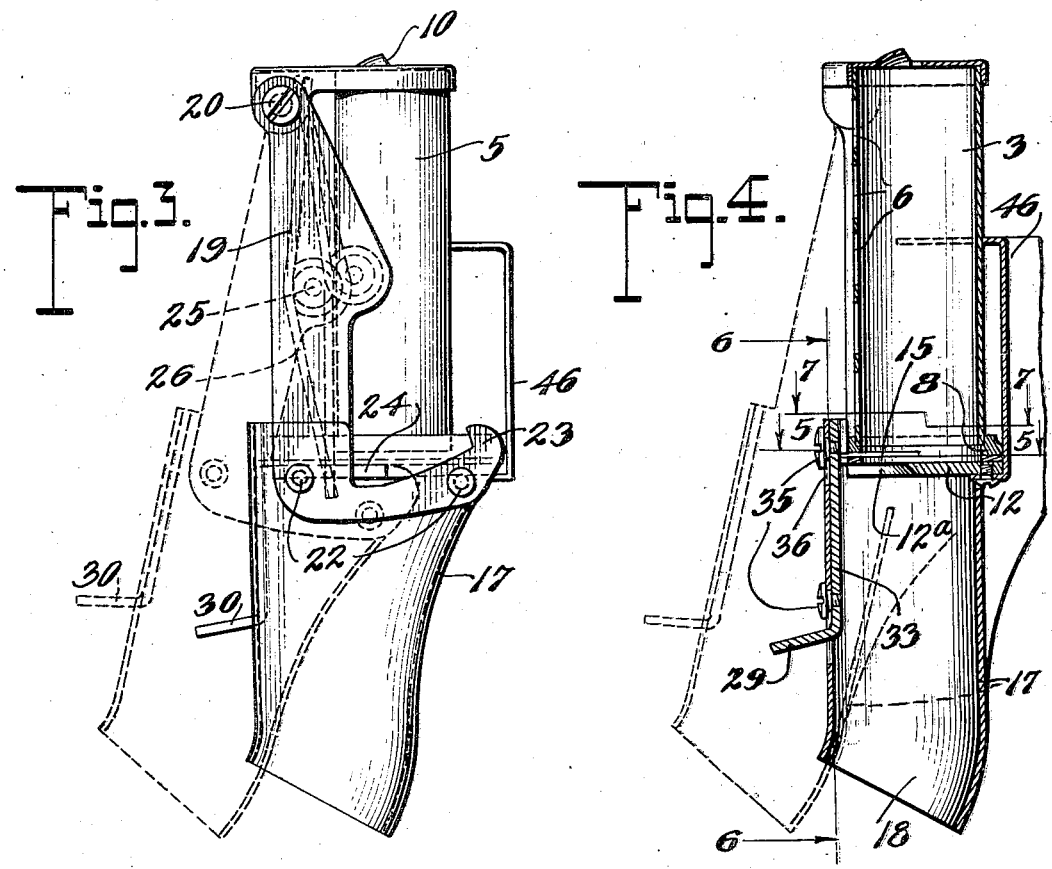
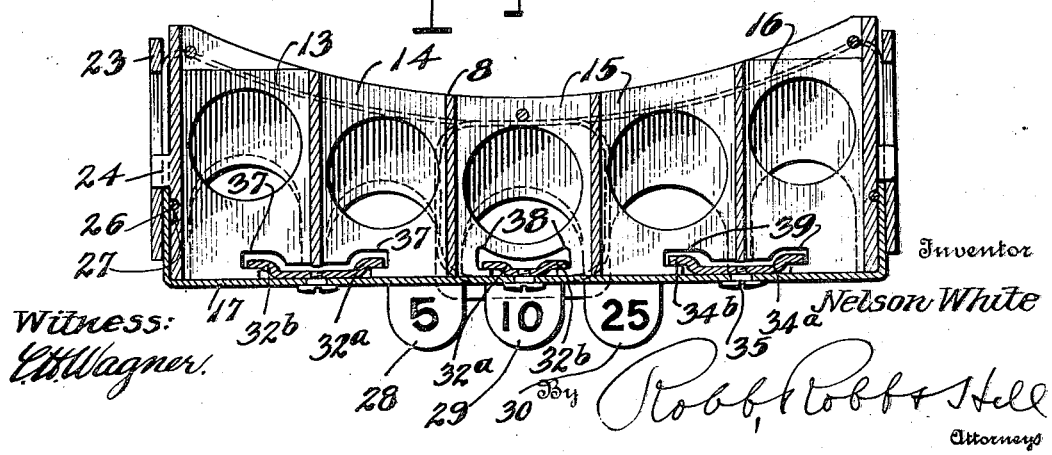

May 8, 1923.
N. WHITE
MONEY PAYING DEVICE
Filed March 5, 1921
1,454,303
5 Sheets-Sheet 3
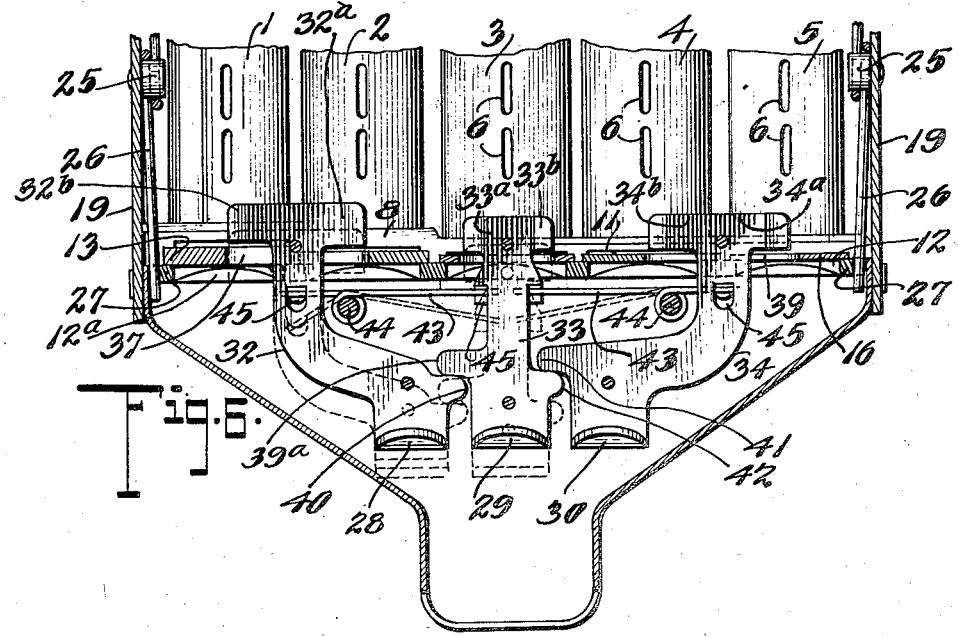
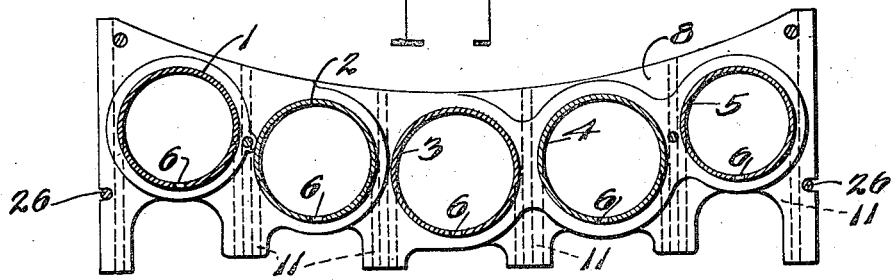
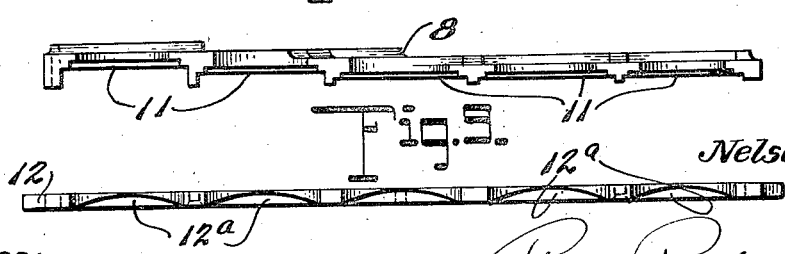
Inventor
Nelson White
Witness:
C.H. Wagner
By Robt Robbs Hill
Attorneys May 8, 1923.

N. WHITE

MONEY PAYING DEVICE

Filed March 5, 1921

Witness:
E. H. Wagner

Inventor
Nelson White

By Robb & Robb & Hill
Attorneys

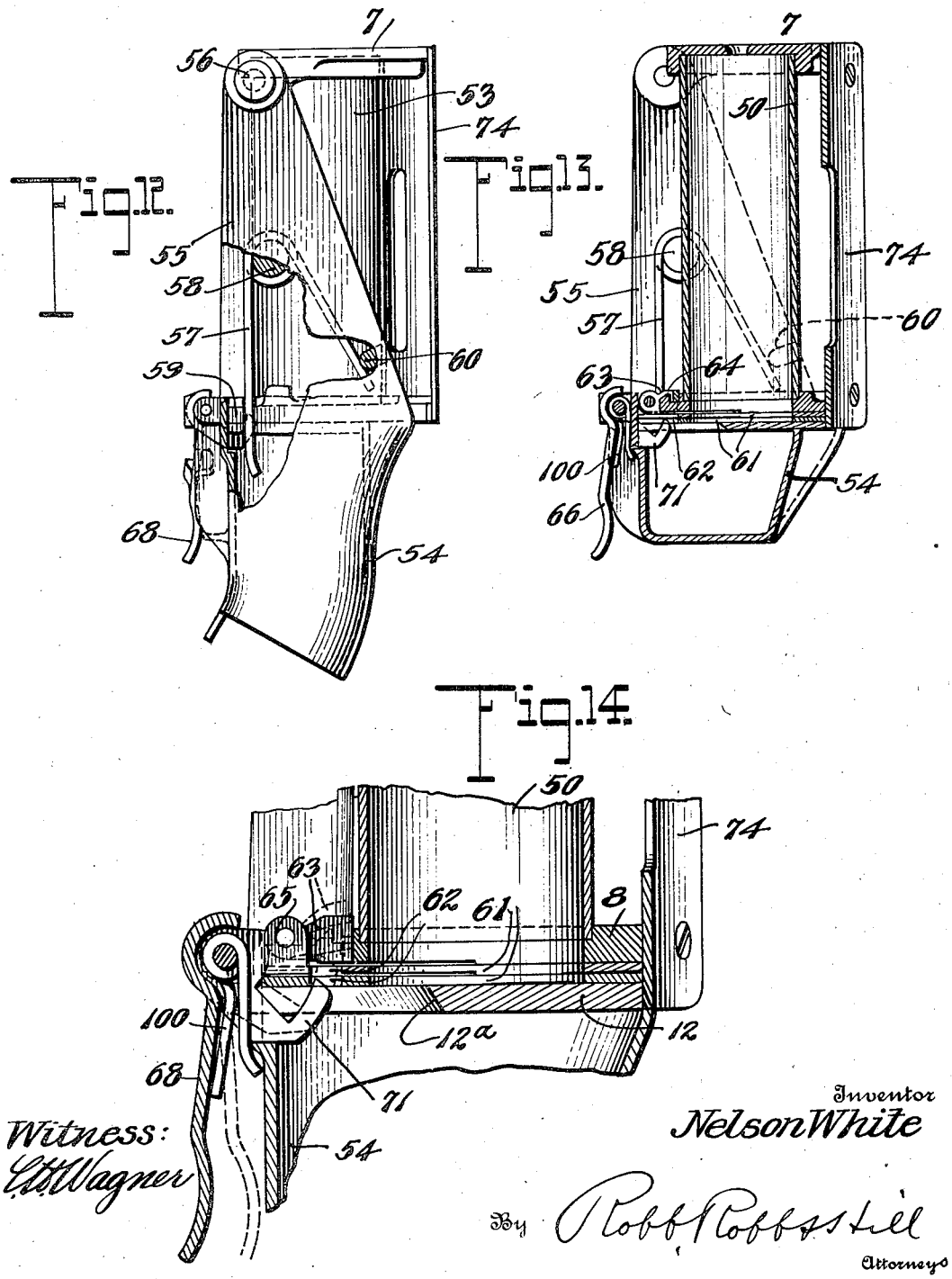

Patented May 8, 1923.

1,454,303

UNITED STATES PATENT OFFICE.

NELSON WHITE, OF ITHACA, NEW YORK.

MONEY-PAYING DEVICE.

Application filed March 5, 1921. Serial No. 449,829.

*To all whom it may concern:*

Be it known that I, NELSON WHITE, a citizen of the United States, residing at Ithaca, in the county of Tompkins and State of New York, have invented certain new and useful Improvements in Money-Paying Devices, of which the following is a specification.

The present invention relates to money paying devices, and has for its object to provide a device of this character which embodies novel features of construction whereby the correct number of coins of different denominations and having a total value corresponding to any selected monetary value within the capacity of the machine can be quickly delivered without the necessity of any mental calculation on the part of the operator, and without the possibility of error or confusion which might be occasioned by the necessity of handling a large amount of loose and mixed up coin. When a selected key or finger piece corresponding to the total value of the money to be delivered is manipulated, this larger value is automatically divided up into smaller denominations and the mechanism set to deliver the correct number of coins of each of the said smaller denominations when the machine is actuated.

Among the further objects of the invention are to provide a money paying machine of this character which is susceptible of being made in small and compact form so that it can be readily carried from place to place or applied to the belt or some article of clothing so as to be supported upon the person of the operator in a convenient position for operation at any time.

The device will be found especially helpful by street car conductors and other persons who are engaged in the class of work requiring the frequent changing of money for patrons. With the "Pay As You Enter" system which is now in very extensive use upon the street car systems of the country, the conductors do not themselves collect the fares, but merely make the necessary change so that the passengers can themselves deposit the correct amount of the fare in a box provided for that purpose. Under these conditions a conductor is constantly furnishing change for different money denominations, mostly of the smaller values, and without some means for accurately handling the money it is very difficult to avoid frequent errors. In order to prevent delays when taking on a large number of passengers, it is also necessary that the transaction be made quickly. The device of the present invention is admirably adapted for use under such conditions, since it is light in weight and compact in form so that it can be easily carried, and provides for quickly and accurately discharging the correct amount of change for the smaller denominations of money which are more usually encountered in such work.

While the invention is susceptible of many different embodiments, there are two particular forms thereof which will be shown in the present application, and for a full understanding thereof reference is to be had to the following description and accompanying drawings in which:—

Figure 1 is a front elevation of a money changing device constructed in accordance with the invention;

Figure 2 is a top plan view thereof;

Figure 3 is a side elevation of the device, the discharge chute being shown by full lines in normal position and by dotted lines in the position assumed when swung forwardly to actuate the selected ejector slides and discharge the proper amount of coin in the different denominations requisite to make the proper change;

Figure 4 is a transverse sectional view on the line 4—4 of Figure 1, the discharge chute being shown by full lines in normal position and by dotted lines in the position assumed when swung forward;

Figure 5 is a transverse sectional view on the line 5—5 of Figure 4, looking in the direction of the arrows;

Figure 6 is a vertical sectional view on the line 6—6 of Figure 4, looking in the direction of the arrows;

Figure 7 is a horizontal sectional view on the line 7—7 of Figure 4, looking in the direction of the arrows;

Figures 8 and 9 are front elevations of the base plate and ejector slide retaining plate respectively;

Figure 12 is a side elevation of the device, parts being broken away and appearing in section;

Figure 13 is a vertical sectional view on the line 13—13 of Figure 10, looking in the direction of the arrows;

Figure 14 is an enlarged sectional view through the two ejector slides for the five cent coin tube, showing the associated parts and the means for selectively operating one or both of the two ejector slides.

Corresponding and like parts are referred to in the following description and accompanying drawings by like reference characters.

Figure 10:
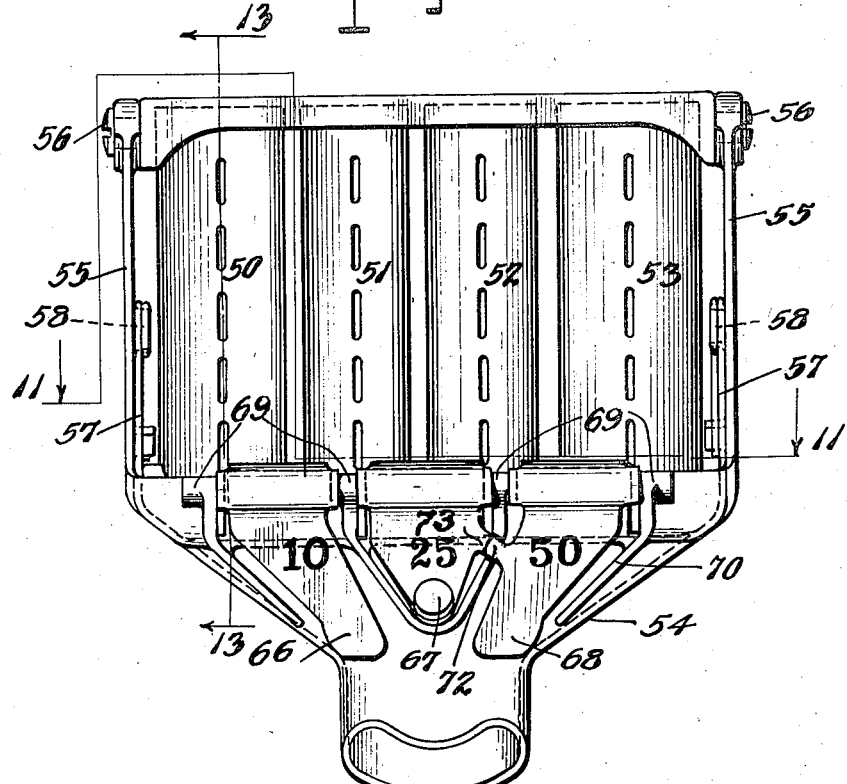
Figure 10 is a front elevation of a slightly modified form of the invention.

The money changing device comprises essentially a coin magazine constructed to hold a supply of coins of the different denominations necessary for making change for money values within the limits of the machine, a manually movable discharge chute, and selectively controlled ejectors associated with the magazine and operatively connected with the discharge chute so that selected or predetermined ejectors will be actuated when the discharge chute is manipulated in the required manner. In the embodiment of the invention illustrated by Figures 1 to 9 inclusive the magazine comprises a series of coin tubes designated by the numerals 1, 2, 3, 4, and 5, respectively, the tubes 1 and 2 being of a proper size to receive pennies and the tubes 3 and 4 being of the proper size to receive nickels, while the tube 5 is of the proper size to receive dimes or ten cent pieces. These tubes are shown as provided in the front thereof with the usual slits or openings 6 so that it can be readily determined at a glance whether or not the tubes contain an adequate supply of coin. A cap plate 7 fits over the upper ends of the coin tubes, being flanged and properly shaped so as to engage the coin tubes and hold them accurately in position. Similarly the lower ends of the coin tubes are engaged by a base plate 8, the cap plate and base plate being connected by the tie rods 9 by means of which the parts are held securely in assembled position. The cap plate 7 is provided with the usual coin slots 10 which are positioned over the respective tubes and enable coins of the different denominations to be inserted in the proper tubes.

The base plate 8, shown in detail by Figures 7 and 8, is provided with openings registering with the different coin tubes, and the lower face of the base plate is suitably recessed at 11 to provide guideways for the coin ejecting slides. A retaining plate 12 fits against the bottom of the base plate 8 and operates both to retain the ejector slides within the guideways 11 and to support the columns of coin in the respective coin tubes. The ejector slide 13 for the penny tube 1 is of a sufficient thickness to eject three pennies at each operation, while ejector 14 for the penny tube 2 is of the proper thickness to eject two pennies at each operation. It will thus be obvious that if the two penny ejector slides 13 and 14 are operated at the same time, a total of five pennies will be ejected and the proper change made for a nickel or five cent piece. The two five cent ejectors 15 for the nickel tubes 3 and 4 and the dime ejector 16 for the dime tube 5 are each of the proper thickness to eject a single coin at each operation. In order to make change for a nickel the two penny ejector slides must be operated to eject five pennies. In order to make change for a dime the five cent ejector is operated in addition to the two penny ejectors so that a total of one nickel and five pennies are ejected. Similarly, in order to make change for a quarter of a dollar, all of the ejector slides are operated, with the result that a total of one dime, two nickels, and five pennies are ejected.

Arranged at the lower end of the magazine is a bodily movable discharge chute 17 which is adapted to be manually actuated or manipulated for the purpose of actually ejecting the coins after the selective mechanism has been properly set to provide for the discharge of the correct amount of change. The flared upper end of the discharge chute 17 fits around the front and sides of the base of the coin magazine, the rear edge of the discharge chute being slightly cut away so that it will swing under and clear the magazine when the chute is swung forwardly. The tapered lower end of the chute terminates in a spout 18 through which the ejected coins are intended to drop into the palm of the hand by which the chute is swung forwardly to actuate the selected ejectors. The ends of the discharge chute are provided with upwardly extending arms 19 which are pivotally connected at 20 to the top portion of the magazine. In the present instance these pivot members 20 engage forwardly and laterally deflected extensions 21 at the opposite ends of the cap plate 7. The arms 19 are also shown as constructed as separate parts and suitably secured by the fastening members 22 to the discharge chute 17, although this is not at all essential to the invention. The arms 19 are also illustrated as having an L-shaped formation with the lateral extensions at the lower ends thereof projecting rearwardly and terminating in hooked noses 23 which are adapted to engage stop shoulders 24 on the retaining plate 12 to limit the forward swinging movement of the discharge chute. It will be obvious that the rearward swinging movement of the discharge chute is limited by the engagement of the upper forward edge of the chute with the base of the coin magazine. The arms 19 are provided at intermediate portions in their length with inwardly projecting studs 25 which engage coiled intermediate portions of spring strips or wires 26. The upper extremities of these spring strips engage the cap plate, while the lower extremities thereof are received within notches 27 in the ends of the base plate 8. With this construction and arrangement it will be obvious that the two spring strips 26 will be flexed and placed under an increased amount of tension when the discharge chute 17 is swung forwardly, so that the discharge chute will be automatically returned to its normal position under the coin magazine as soon as it is released.

Mounted upon the front of the discharge chute is a series of finger pieces or keys which correspond in value to the monetary values of the different denominations of money for which change can be delivered by the machine. In the present instance there are three of these finger pieces, the finger piece 28 being of five cent value, the finger piece 29 being of ten cent value, and the finger piece 30 being of twenty-five cent value. These finger pieces extend through slots or openings 31 in the front of the discharge chute and are rigid with the lower ends of the corresponding selector bars 32, 33 and 34, respectively. These selector bars are slidably mounted upon the interior of the discharge chute, being indicated in the present instance as provided with screws 35 which operate within slots 36 in the discharge chute to direct the selector bars in their up and down movement. The selector bar 5 is deflected laterally toward the penny tubes and terminates at the upper end thereof in a head 32$^a$ which is normally located above the penny ejectors 13 and 14. This head 32$^a$ is provided at opposite ends thereof with offset and laterally projecting wings 32$^b$ which register with notched portions 37 of the two penny ejectors, so that when the selector bar is moved downwardly the wings 32$^b$ at the upper end thereof will engage and interlock with the notches 37. This is done when the five cent key or finger piece 28 is pushed downwardly, and it will be obvious that if the discharge chute 17 is swung forwardly while the five cent finger piece is depressed, the two penny ejector slides 13 and 14 will both be operated and five pennies discharged from the machine.

The ten cent selector bar 33 terminates at its upper end in a head 33$^a$ provided with a pair of laterally projecting and offset wings 33$^b$ which are normally positioned above the nickel ejector 15 for the nickel tube 3, although they are moved downwardly into engagement with notches 38 in the said nickel ejector when the ten cent finger piece 29 is depressed. It will also be noted that the ten cent selector bar 33 is provided with a lateral arm 39$^a$ which overhangs and engages a shoulder 40 on the five cent selector bar 32. The five cent selector bar 32 can thus be operated independently of the ten cent selector bar 33, although the five cent selector bar 32 is automatically operated simultaneously with the ten cent selector bar 33 each time that the latter is operated. It will thus be obvious that by depressing the ten cent finger piece 29 the two selector bars 32 and 33 are simultaneously moved and connection made between the wings at the upper ends of the selector bars and the notches of the penny ejectors 13 and 14 and the five cent ejector for the nickel tube 3. If the discharge chute 17 is then swung forwardly, one nickel and five pennies will be discarged, and this is the correct change for a dime.

The twenty-five cent selector bar 34 is deflected laterally and terminates at its upper end in a head 34$^a$ which is provided as in the previous instance with the offset and laterally projecting wings 34$^b$. These wings operate in the same manner as that previously described to engage notches 39 in the nickel ejector 15 for the nickel tube 4 and the dime ejector 16. The depression of the twenty-five cent finger piece thus acts directly to set the ejectors for a nickel and a dime. In addition to this an arm 41 on the twenty-five cent selector bar engages a shoulder 42 on the ten cent selector bar so that the ten cent selector bar is moved simultaneously therewith. The five cent selector bar is also moved, owing to the interengagement of the arm 39 and shoulder 40. In addition to setting the ejectors for a dime and a nickel, as previously mentioned, the operation of the twenty-five cent finger piece also operates through the ten cent selector bar and five cent selector bar to set the ejectors for an additional nickel, and five pennies. Upon the operation of the discharge chute, all of the ejector slides will then be actuated, with the result that one dime, two nickles and five pennies will be discharged, this being the proper change for a twenty-five cent piece. The selector bars are held yieldably in an elevated and inoperative position by means of springs 43, said springs being indicated as in the form of wires which are coiled at intermediate points in their length around studs 44, the ends of the wires engaging ears 45 on the different selector bars. It will thus be obvious that one or more of these springs is placed under tension when any of the finger pieces is manipulated, and that the parts will be returned to their original positions as soon as the finger piece is released.

Arranged at the back of the magazine is a keeper 46 which is adapted to engage the belt so that the money changing machine can be conveniently supported at the waist of the wearer in such a position that the spout 18 of the discharge chute 17 can be readily grasped by one of the hands. In the act of grasping the spout the palm of the hand is positioned directly under the spout and the thumb caused to engage the particular key or finger piece having a value corresponding to the total amount of change which it is desired to discharge from the magazine. For instance, if five pennies are wanted, the five cent key or finger 28 is pushed downwardly preparatory to swinging the discharge chute bodily forward, while if a nickel and five pennies are wanted the ten cent finger piece 29 is pushed downwardly, or if a dime, two nickels and five pennies are wanted the twenty-five cent finger piece 30 is pushed downwardly. The coin ejecting slides 13, 14, 15 and 16 are of the usual construction, being provided with openings receiving the lower coin or coins of the corresponding coin tubes when the ejectors are in a retracted position. When the ejectors are moved forwardly by the bodily swinging of the discharge chute 17, as previously described, the coins within the openings of the ejectors are moved forwardly and dropped through notched or cut away portions 12$^a$ in the forward edge of the retaining plate 12. The edges of these notched portions 12$^a$ are bevelled so that there will be no tendency for the coin to catch or bind upon the edge portions thereof and clog the machine.

Figure 11:
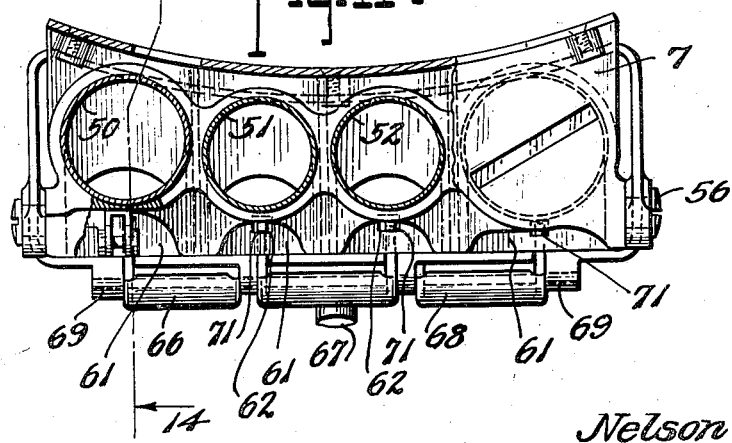
Figure 11 is a top plan view with parts thereof broken away and shown in section.

Figures 10 to 14 inclusive illustrate a somewhat modified construction in which the selector elements are pivotally mounted instead of slidably mounted. The coin magazine is constructed substantially as in the previous instance, although the coin tubes are for different denominations of money, since no provision is made for handling pennies, and the capacity of the machine extends to fifty cents instead of twenty-five cents. There are four coin tubes in the magazine, namely, a nickel tube 50, two dime tubes 51 and 52, and a twenty-five cent tube 53. The discharge chute 54 is mounted to have a bodily swinging movement as in the previous instance, being provided at the ends thereof with upwardly extending arms 55 which are pivotally connected at 56 to the top of the coin magazine. Springs 57 are provided to return the discharge tube to normal position as soon as it is released, and these springs have an arrangement slightly different from that previously described. These springs are shown more clearly by Figures 12 and 13, and it will be observed that they are substantially U shaped, being provided at their curved portions with coils which engage lugs 58 on the arms 55. One end of each of the springs engages a shoulder 59 at the corresponding end of the magazine, while the other end of the spring engages a projection 60 on the arm of the chute 54. With this construction it will be obvious that when the discharge chute is swung forwardly the two springs will be placed under tension, with the result that the discharge chute will be returned to normal position as soon as it is released.

An ejector slide is provided at the lower end of each of the coin tubes, being mounted substantially as in the previous instance and provided at its forward end with an opening 62. The nickel or five cent tube is provided with two of these ejector slides 61 which are superposed directly upon each other so that if both of the slides are simultaneously operated two nickels will be discharged, while if only the lower ejector slide is operated a single nickel only will be discharged. The upper ejector slide 61 for the nickels tube, as shown more clearly by Figures 13 and 14, is provided at its forward end with a U shaped bail or detent 63 which is adapted to engage a nose or projection 64 at the base of the magazine to lock the said slide against movement. The forward end of the detent 63 is pivoted to upstanding ears 65 on the outer end of the coin ejecting slide, and a portion of the detent extends across the opening 62 so that by swinging a hooked arm upwardly through the opening for the purpose of engaging the slide, the same arm can be caused to engage the detent 63 and swing it upwardly away from the nose 64, thereby releasing the said ejector slide so that the two superposed slides can be operated simultaneously to discharge two nickels at the same time.

The front of the discharge chute 54 is provided with three finger pieces 66, 67 and 68 respectively, the finger piece 66 being for ten cents, the finger piece 67 for twenty-five cents, and the finger piece 68 for fifty cents. These finger pieces are pivotally mounted at their upper ends between outstanding ears 69, and the finger pieces are received within spaces which are provided on the front of the discharge chute by means of suitably arranged outstanding flanges or ribs 70. The axes of all of the finger pieces are horizontally disposed and in alinement with each other, and the pivot end of each of the finger pieces is provided with one or more hook members 71, said hook members extending inwardly through clearance openings provided in the front of the discharge chute, and adapted to interlock with the openings 62 of selected ejector slides for the purpose of ejecting and discharging the proper amount of change in different small denominations when the discharge chute is swung forwardly. The hook member 71 of the ten cent finger piece 66 is normally in engagement with the opening 62 of the lower ejector slide 61 for the nickel tube. If the ten cent finger piece 66 is pressed inwardly, this hook member 71 is swung upwardly through the opening 62 of the upper nickel ejecting slide, thereby engaging the slide and at the same time swinging the detent 63 upwardly into inoperative position so that the slide is released. If the discharge chute is then swung forwardly, both of the nickel ejector slides 61 will be operated and two nickels discharged from the machine.

The twenty-five cent finger piece 67 is provided with two of the hook members 71 which are so positioned that when this finger piece is pushed inwardly the hook members will swing upwardly into engagement with the openings 62 of the two ejector slides 61 for the two dime tubes 51. It will be remembered that the hook member 71 for the ten cent finger piece 66 is always in engagement with the lower nickel ejector slide 61, so that when the discharge chute 54 is swung forwardly with the twenty-five cent finger piece depressed there will be two dimes and one nickel discharged from the coin magazine.

The fifty cent finger piece 68 has a hook member 71 which is adapted to engage the opening 62 of the twenty-five cent ejector slide 61 when the said fifty cent finger piece is depressed. This fifty cent finger piece is also provided with a lateral projecting ear 72 which extends over a corresponding ear 73 on the twenty-five cent finger piece 67. It will thus be obvious that the twenty-five cent finger piece can be depressed independently of the fifty cent finger piece, although when the fifty cent finger piece is pressed inwardly the inter-engagement of the ears 72 and 73 causes the twenty-five cent finger piece to be also pressed inwardly. It will thus be obvious that if the discharge chute 54 is swung forwardly with the fifty cent finger piece 68 depressed there will be one twenty-five cent piece, two dimes and one nickel discharged from the magazine, the total value of these coins being fifty cents. Arranged at the back of the coin magazine is a belt engaging plate 74 which can be utilized as in the previous instance to support the device upon the belt in a convenient position at the waist of the wearer. When it is desired to discharge change for a given amount, or to obtain a number of coins of small denomination having a total value corresponding to the monetary value of one of the finger pieces, it is merely necessary to press the selected finger piece inwardly and swing the discharge chute forwardly. The essential features of this modified form of the invention are substantially the same as in the previous construction. There are certain immaterial differences in the details of the mechanism, and the selectively operated finger pieces are pivotally mounted instead of slidably mounted. The modified form illustrates an arrangement which ignores pennies and delivers change of such a character that there is always included therein a nickel or five cent piece. This construction would, of course, not be suitable for the use of street car conductors upon lines where the fare is for an odd number of cents so that a number of pennies are necessarily included therein. Under such conditions the construction shown by Figures 1 to 9 would be necessary. It will be understood that the capacity of the machine can be enlarged so as to deliver change for larger sums, if this is found desirable, and that the various structural details can be changed and modified without departing from the spirit of the invention. Suitable springs 100 may be provided for returning the finger pieces 66, 67 and 68 to their original positions.

Having thus described my invention, what I claim as new and desire to secure by Letters Patent is:—

1. A money paying device, including a coin magazine, ejecting means, and a bodily movable discharge chute for actuating the ejecting means and conveying the discharged coin away from the device.

2. A money paying device including a coin magazine, selectively controlled ejecting means associated with the coin magazine, and a bodily movable discharge chute for actuating the ejecting means and conveying the ejected coins away from the device.

3. A money paying device including a coin magazine formed with a plurality of coin tubes, ejectors for the respective coin tubes, a bodily movable discharge chute, and selective means for operatively connecting the discharge chute to selected ones of the ejectors to discharge coins having a predetermined total value when the discharge chute is moved.

4. A money paying device including a plurality of coin tubes, ejectors for the respective coin tubes, a bodily movable discharge chute, and selective mechanism mounted upon the discharge chute for operatively connecting the discharge chute to selected ones of the ejectors so that when the discharge chute is moved coins having a predetermined total value will be ejected.

5. A money paying device, including a plurality of coin tubes, ejectors for the respective coin tubes, a bodily movable discharge chute, finger pieces of different monetary values, and means actuated by the different finger pieces for operatively connecting the discharge chute with certain ejectors so that when discharge chute is moved, coin having a total value corresponding to the value of the actuated finger piece will be discharged.

6. A money paying device including a plurality of coin tubes, ejectors for the respective coin tubes, a bodily movable discharge chute, finger pieces of different monetary values, selector bars associated with the different finger pieces, and means associated with the selector bars for interlocking certain of the ejectors with the discharge chute so that when the discharge chute is moved coin having an aggregated total value corresponding to the value of the manipulated finger piece will be discharged.

7. A money paying device including a plurality of coin tubes, ejectors for the respective coin tubes, a bodily movable discharge chute, finger pieces of different monetary values, slidable selector bars actuated by the finger pieces, and lateral wings carried by the selector bars, the ejectors being formed with notched portions adapted to interlock with the wings whereby when the discharge chute is moved selected ejectors are actuated to discharge coin having an aggregate value corresponding to the value of the manipulated finger piece.

8. A money paying device, including a coin magazine, a plurality of coin ejectors associated therewith, a bodily movable discharge chute, finger pieces of different monetary values, means actuated by the finger pieces for operatively connecting the discharge chute with certain of the ejectors, and means for causing the finger pieces of a higher monetary value to engage and operate those of a lower value, whereby when the discharge chute is moved selected ejectors will be operated to discharge coin having an aggregate value corresponding to the value of the manipulated finger piece.

9. A money paying device, including a coin magazine, a plurality of coin ejectors associated therewith, a bodily movable discharge chute, finger pieces of different monetary values, slidably mounted selector bars associated with the finger pieces, means whereby each of the selector bars is automatically operated when the selector bar of the next higher value is operated, and means controlled by the selector bars for operatively connecting the discharge chute to selected ejectors which are to be actuated when the discharge chute is moved.

10. A money paying device including a coin magazine, a plurality of coin ejectors associated therewith, a bodily swinging discharge chute movable under the magazine and arranged to receive the coin discharged by the ejectors, arms projecting from the chute and pivotally connected to the upper portion of the magazine, and selective means for operatively connecting the discharge chute to selected ones of the ejectors.

11. A money paying device including a coin magazine, a plurality of coin ejectors associated therewith, a bodily swinging discharge chute movable under the magazine and adapted to receive the coin discharged by the ejectors, upwardly projecting arms at the ends of the discharge chute which are pivotally connected to the top of the magazine, yielding means tending to hold the chute in inoperative position, stops limiting the swinging movement of the chute, and selective means for operatively connecting the discharge chute to selected coin ejectors to discharge coins having a predetermined total value.

12. A money paying device including a series of coin tubes, cap and bottom plates for the tubes, ejectors mounted upon the bottom plate, a swinging discharge chute bodily mounted upon the cap plate and movable under the magazine, said chute being adapted to receive the coin discharged by the ejectors, and selective means for operatively connecting the discharge chute to selected ejectors.

13. A money paying device including a coin magazine, a plurality of coin ejectors associated therewith, a bodily movable discharge chute, and finger pieces arranged adjacent the discharge end of the spout so that they can be selectively manipulated by the fingers of a hand which has grasped the chute and is in position to receive the coin discharged therefrom, and means controlled by the finger pieces for operatively connecting the chute to selected ejectors.

14. A money paying device including a plurality of coin magazines, ejecting means associated therewith, a discharge chute receiving the coins discharged from all of the magazines, finger pieces arranged adjacent the discharge end of the chute for selective manipulation by the fingers of a hand which has grasped the chute and is in position to receive the coins delivered thereby, and means actuated by the finger pieces for selectively controlling the ejecting means.

15. A money paying device including a coin magazine, ejecting means associated therewith, a discharge chute, and selective means mounted upon and carried by the discharge chute for the control of the ejecting means.

16. A money paying device including a coin magazine, a plurality of coin ejectors associated therewith, an ejector actuating member, and selective means mounted upon the said ejector actuating member and adapted to produce an interlocking connection between the ejector actuating member and selected ejectors.

17. A money paying device, including a coin magazine, a plurality of coin ejectors associated therewith, an independent movable ejector actuating member, finger pieces of different monetary values mounted directly upon the movable ejector actuating member, and means actuated by the finger pieces for interlocking the ejector actuating member with selected ejectors and set the machine to discharge coin having an aggregate value corresponding to the value of the manipulated finger piece.

18. A money paying device, including a coin magazine, a plurality of coin ejecting slides associated therewith, an independent swinging ejector actuating member, finger pieces of different monetary values mounted directly upon the swinging ejector actuating member, and selective means controlled by the finger pieces for operatively interlocking the ejector actuating member with selected coin ejecting slides and setting the machine to discharge coin having an aggregate value corresponding to the value of the manipulated finger piece.

19. A money paying device, including a coin magazine, a plurality of coin ejecting slides associated therewith, an independent ejector actuating member, finger pieces of different monetary values mounted directly upon and carried by the ejector actuating member, slidably mounted selector bars associated with the finger pieces, and means controlled by the selector bars for operatively interlocking the ejector actuating member with selected ejector slides and setting the machine to discharge coin having an aggregate value corresponding to the value of the manipulated finger piece.

20. A money paying device including a coin magazine, a plurality of coin ejectors associated therewith, an ejector actuating member, a plurality of selector bars mounted upon the actuating member and having heads adapted to be moved into and out of operative connection with the respective ejectors, and finger pieces of different monetary values associated with the selector bars whereby when any selected finger piece is manipulated the machine will be set to discharge coin having an aggregate value corresponding to the value of the finger piece.

21. A money paying device, including a coin magazine, a plurality of coin ejecting slides associated therewith, a swinging ejector slide actuating member, selector bars slidably mounted upon the said actuating member and formed with heads adapted to be moved into and out of interlocking connection with the respective ejector slides, and finger pieces of different monetary values connected with the selector bars whereby when a selected finger piece is manipulated the device will be set to discharge coin having an aggregate value corresponding to the value of the said finger piece.

22. A money paying device, including a coin magazine, a plurality of coin ejectors associated therewith, a swinging ejector actuating member, a plurality of selector bars mounted upon the actuating member and having head portions adapted to be moved into and out of interlocking connection with selecting ejectors, finger pieces of different monetary values connected to the selector bars, and means whereby each of the selector bars is automatically operated when the selector bars of the next higher value is operated, so that when any selected finger piece is manipulated the machine will be set to discharge coin having an aggregate value corresponding to the value of the said finger piece.

In testimony whereof I affix my signature.

NELSON WHITE.